July 18, 1939. D. I. BOHN ET AL 2,166,900
ELECTRIC CURRENT CONVERTING SYSTEM
Filed Sept. 22, 1938 3 Sheets-Sheet 1

Fig. 1

July 18, 1939.  D. I. BOHN ET AL  2,166,900

ELECTRIC CURRENT CONVERTING SYSTEM

Filed Sept. 22, 1938    3 Sheets—Sheet 3

Inventors
D. I. Bohn
O. K. Marti
by their Attorney

Patented July 18, 1939

2,166,900

UNITED STATES PATENT OFFICE

REISSUED

APR 21 1942

2,166,900

ELECTRIC CURRENT CONVERTING SYSTEM

Donald I. Bohn, Pittsburgh, Pa., and Othmar K. Marti, Wauwatosa, Wis., assignors to Allis-Chalmers Manufacturing Company, Milwaukee, Wis., a corporation of Delaware Application September 22, 1938, Serial No. 231,094

20 Claims. (Cl. 175—363)

This invention relates in general to improvements in electric current converting systems of the electric valve type, and more particularly to means for controlling the flow of alternating current components of different frequencies in the connections of a coverting system joining an alternating current circuit with a direct current circuit.

Electric current converting systems comprising electric valves, which are frequently utilized for transmitting current between a polyphase alternating current circuit and a direct current circuit, have the inherent property of causing the flow of alternating current components of different frequencies in the connections thereof with the associated circuits. While these current components are frequently harmless, they may induce disturbing currents in communication circuits adjacent alternating current circuits connected with large converting systems of the type considered.

For the purpose of reducing the disturbing effect of these current components, converting systems have been devised which are intended to inherently prevent the flow of the larger and most disturbing of the current components. As is well known, this result is usually sought by connecting the valves of the system with the alternating current circuit through a suitable phase multiplying transformer. For example, alternating current rectifying systems frequently comprise a phase doubling transformer having a three phase primary winding and a six phase secondary winding. In transformers of this type, the windings may be star connected windings or polygon connected windings having each phase portion thereof inductively related with only one of the legs of the associated core. The windings may therefore be symmetrically arranged to cause the voltages thereof to form a well balanced polyphase system of voltages. When it is desired to increase further the number of transformer phases, however, it becomes necessary to utilize so-called zigzag or fork connected windings, in which each phase portion is divided into a plurality of unequal sections associated with different phase legs of the core. The transformer then becomes excessively complicated and expensive to manufacture, and it has been found by experience that it is not possible to obtain therefrom an accurately balanced polyphase system of voltages at all loads. As a result of this unbalance, the current components which should be inherently suppressed in the connections of the converting system with the associated circuits may, on the contrary, have considerable magnitudes therein.

Instead of using only one phase multiplying transformer having a secondary winding comprising a large number of phase portions, the system may comprise a plurality of transformers having secondary windings so connected that each transformer secondary winding forms a polyphase system of a relatively low number of phases and that all the secondary windings jointly form a polyphase system of a relatively large number of phases. For example, a phase doubling transformer having a star connected primary winding and a second phase doubling transformer having a polygon connected primary winding may be used in parallel to jointly multiply the number of phases of the system to four times the number of phases of the alternating current circuit. To further increase the number of phases of the system, it is, however, again necessary to resort to fork or zigzag connected windings divided into unequal sections, which only permit partly to reduce the magnitudes of the particular current components of which the flow should be substantially prevented in the connections of the system.

These disadvantages of phase multiplying transformers may be avoided by utilizing a plurality of transformers of which each leaves the number of phases of the system unaltered or increases the number of phases of the system to twice the number of phases of the alternating current circuit, and by increasing the number of phases of the system to a number greater than four times the number of phases of the alternating current circuit by connecting the transformers with the alternating current circuit through suitable phase shifting means. The desired suppression of certain current components in the connections of the system may also be obtained by the joint use of phase shifting means and of conductivity controlling means acting on the valves, or even by the use of the latter means alone.

It is therefore one of the objects of the present invention to provide an electric current converting system of the electric valve type in which certain current components may be substantially suppressed in the connections of the system.

Another object of the present invention is to provide an electric current converting system of the electric valve type in which the number of phases of the system may be made equal to more than four times the number of phases of an alternating current circuit connected therewith through a plurality of phase doubling transformers.

Another object of the present invention is to provide an electric current converting system of the electric valve type in which the number of phases of the system may be made equal to more than four times the number of phases of an alternating current circuit connected therewith by means of phase shifters distinct from the usual phase doubling transformers.

Another object of the present invention is to provide an electric current converting system of the electric valve type in which the flow of certain current components in the connections of the system may be controlled by controlling the conductivity of some of the valves of the system.

Objects and advantages other than those above described will be apparent from the following description when read in connection with the accompanying drawings, in which.

Figure 1:
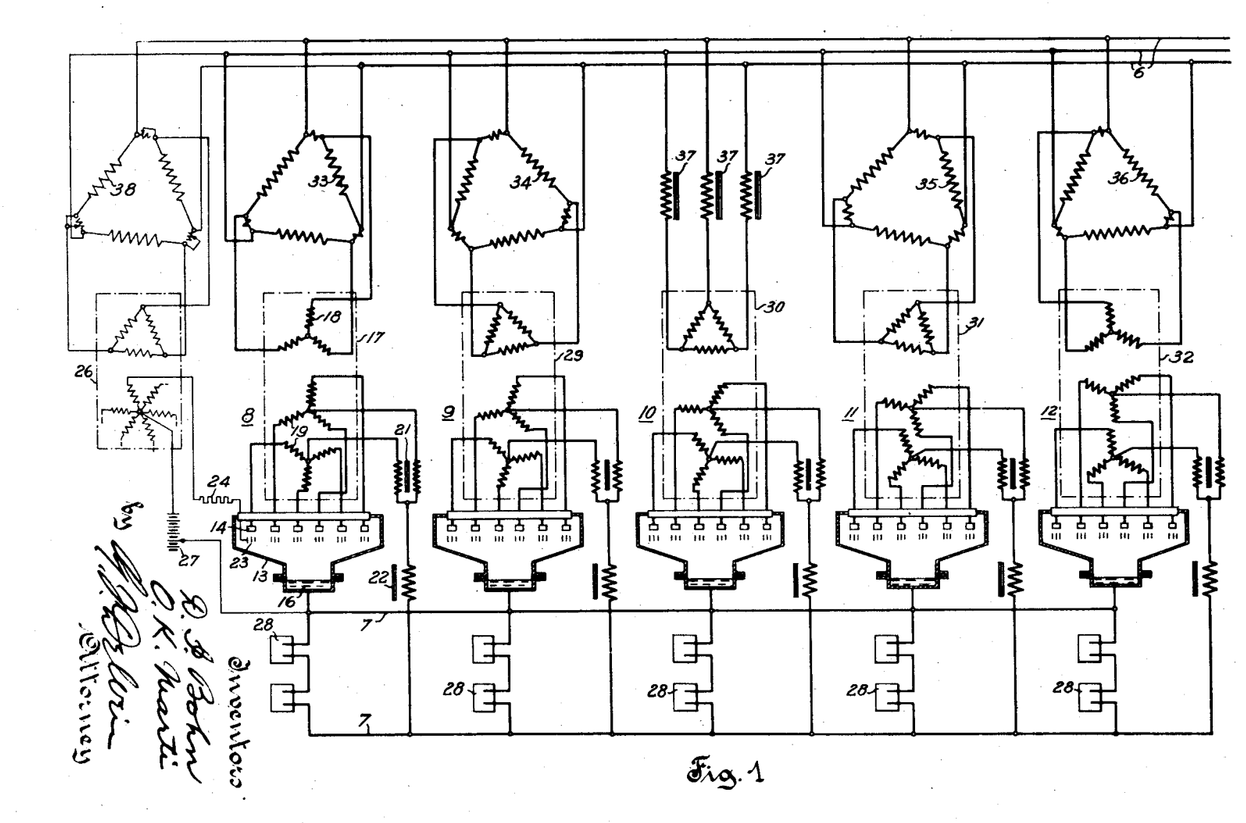
Fig. 1 diagrammatically illustrates one embodiment of the present invention in which five parallel six phase converters are connected to form a thirty phase system.

Referring more particularly to the drawings by characters of reference, reference numeral 6 designates a polyphase alternating current circuit to be interconnected with a direct current circuit 7 through a converting system comprising a plurality of parallel converters 8, 9, 10, 11, 12 of the electric valve type. Although circuit 6 may comprise any predetermined number of phase conductors, a three phase circuit is herein illustrated for the reason that this type of circuit is most frequently utilized in practice. As a matter of convenience, circuit 6 will hereinafter be considered as being a supply circuit connected with a suitable current generator (not shown) and circuit 7 as being an output circuit, although the system is also operable for the transmission of energy between a direct current supply circuit and an alternating current output circuit.

The different converters are arranged similarly to one another and a detailed description of all the converters is therefore believed unnecessary. Converter 8 may be taken as representative of all the converters and comprises a plurality of electric valves generally designated by 13. These valves are severally provided with anodes 14 which are preferably arranged within a common casing, the cathodes of the valves then being combined into a common cathode structure 16. Suitable means (not shown) are provided for bringing cathode 16 into electron emitting condition and for maintaining the cathode in such condition, as is well known.

Anodes 14 are severally connected with circuit 6 through a main transformer 17 having a first star connected winding 18 divided into three equal phase portions and a second star connected winding 19 divided into six equal phase portions. Transformer 17, like all other transformers to be described hereinafter, may be a unitary structure of the polyphase shell type or core type, or may consist of an equivalent plurality of single phase structures. Under the assumptions made above, winding 18, which is connected with circuit 6, is the primary winding of transformer 17 and winding 19, which is connected with those valves of the system designated by 13, is the secondary winding of the transformer. Winding 18 is preferably provided with a plurality of taps to permit adjustment of the magnitudes of the terminal voltages of winding 19. The designations of star connected winding and polygon connected winding are herein intended to apply only to windings in which each phase portion, i. e., each portion joining two terminals or joining a terminal with a neutral point, is inductively related with only one leg of the associated core. The phase portions of winding 19 are preferably divided into two groups to provide two neutral points severally connected with the negative conductor of circuit 7 through an interphase transformer 21. Cathode 16 is connected with the positive conductor of circuit 7 to complete the path of the flow of current through the converter. The connections between converter 8 and circuit 7, as well as the portion of circuit 7 carrying current received from converter 8, are advantageously arranged to be endowed with a material amount of inductance which may be supplemented by the insertion therein of an inductive reactor 22.

The conductivity of valves 13 may be controlled by means comprising control electrodes 23 severally associated with anodes 14 and each arranged in or about the path of the discharge between the associated anode and cathode 16. Although valves 13 may be of any suitable known type, it may be assumed that the valves are of the discontinuously controllable type. Each control electrode accordingly prevents the flow of current through the associated anode when the control electrode is at a predetermined negative potential with respect to the potential of cathode 16 taken as datum. The control electrode also releases the flow of current through the associated anode upon being brought from a negative potential to a positive potential, but cannot regulate the flow of current. To obtain this result, the different control electrodes are preferably severally connected with cathode 16 through circuits each comprising a current limiting resistor 24 and one of the phase portions of the secondary winding of a control transformer 26 having the primary winding thereof energized from circuit 6. The secondary winding of transformer 26 is star connected to provide a neutral point connected with cathode 16 through a source of variable unidirectional voltage such as a battery 27. Circuit 7 supplies current to current consuming devices of any kind such as electrolytic cells 28 preferably arranged in a plurality of parallel banks of serially connected cells.

While converter 12 comprises a main transformer 32 connected in the same manner as transformer 17 of converter 8, converters 9, 10 and 11 differ therefrom in that the transformers 29, 30 and 31 thereof are provided with primary windings connected in polygon connection. If the primary windings of transformers 17 and 29 to 32 were all connected directly with the conductors of circuit 6, as was heretofore the usual practice, the thirty secondary winding portions of the transformers would jointly form a balanced polyphase system having only twelve different phases, i. e., a number of different phases not exceeding four times the number of phases of circuit 6. To cause the voltages of all the secondary windings to form jointly a polyphase system of voltages having a number of phases greater than four times the number of phases of circuit 6, transformers 17 and 29 to 32 are connected with circuit 6 through means comprising suitable phase shifting means such as autotransformers 33 to 36.

Phases shifters 33 and 36 are similar to one another in every particular and are both arranged to introduce a displacement of six degrees in the voltages of the associated main transformers. Phase shifters 34 and 35 are likewise similar to one another and are both arranged to introduce a displacement of twelve degrees in the voltages of the associated main transformers. The connections of the phase shifters with circuit 6 and with the transformers are, however, so arranged that the voltages of transformers 29 and 32 are shifted in the leading direction, and the voltages of transformers 17 and 31 are shifted in the lagging direction. The winding phase portions of the different main transformers have been oriented in the drawing to indicate the phase relation that obtains between the voltages thereof. It will be observed that the different phase portions of the secondary windings of the converter transformers jointly form a well balanced polyphase system having thirty different phases.

Transformers 17 and 29 to 32 are preferably so arranged as to have substantially equal reactances. Phase shifters 33 to 36 are likewise so arranged as to have substantially equal reactances. The reactances of converters 8, 9, 11 and 12 are therefore substantially equal while that of converter 10 has a slightly lower value. Converters 8, 9, 11 and 12 accordingly tend to supply equal currents to circuit 7 while converter 10 tends to supply a greater amount of current to circuit 7. A suitable reactance means such as a polyphase reactor 37 is preferably inserted in the connections of transformer 30 with circuit 6 to substantially equalize the reactances of all the converters and thus cause all the converters to deliver equal currents.

To obtain a uniform control of the conductivity of the valves of the different converters, the different control transformers thereof, of which only transformer 26 is illustrated in the drawing, are preferably connected with circuit 6 in such manner that the phase relationship between the control electrode potentials and the potentials of the associated anodes is the same in all converters. For example, the control transformers of converters 8, 9, 11 and 12 may be connected with circuit 6 through suitable phase shifters such as autotransformer 38 and three further autotransformers (not shown). For the sake of simplicity, the different control autotransformers are preferably all of a unitary design provided with a plurality of taps to permit proper adjustment of the phase shifts imparted thereby to the voltages impressed on the different control transformers.

To render more apparent the advantages of the system described above, reference is made to Fig. 3 in which curve 39 represents one of the voltages to neutral of circuit 6, which voltages are assumed to be of the usual sinusoidal wave form. The current flowing between the corresponding conductor of circuit 6 and a converter, such as converters 8 and 12, assumed to be directly connected therewith, would be substantially of the rectangular wave form represented by curve 41. The current flowing between the same conductor of circuit 6 and a converter such as converters 9, 10 and 11 assumed directly connected therewith, would be substantially of the stepped wave form represented by curve 42, as is well known. It can be shown that these currents each comprise a fundamental component having the same frequency as the voltage of circuit 6 and a plurality of harmonic components of different orders. These harmonic components are sinusoidal alternating components of different frequencies multiple of the fundamental frequency of the voltage of circuit 6, the order of any harmonic being the ratio of the frequency of the harmonic to the fundamental frequency. For example, an analysis of both curve 41 and curve 42 would reveal that the most prominent harmonic components thereof are of the orders 5, 7, 11, 13, 17, 19, 23, 25, 29 and 31, and are of decreasing magnitudes in the order recited.

Figure 3:
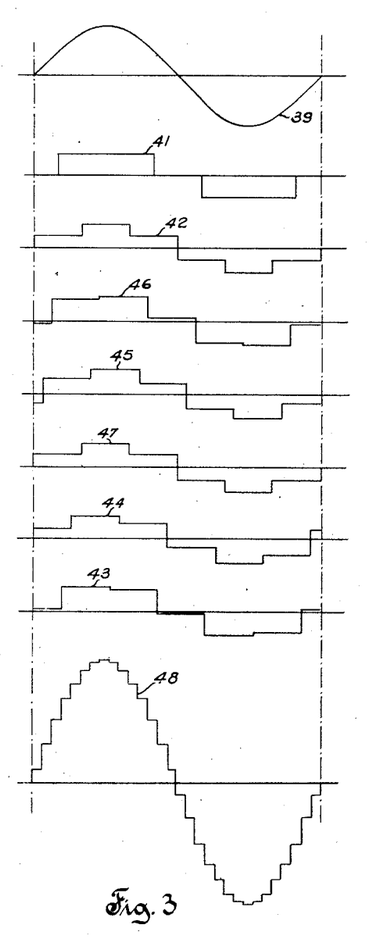
Fig. 3 is a diagram of the currents in some of the connections of the embodiment illustrated in Fig. 1 with the associated alternating current circuit.

If curve 39 is assumed to represent any of the primary voltages to neutral of transformers 17 and 29 to 32, regardless of the phase relationship therebetween, curve 41 also represents any of the currents flowing in the primary winding connections of transformers 17 and 32, and curve 42 also represents any of the currents flowing in the primary winding connections of transformers 29, 30 and 31. The joint current flowing through circuit 6 to the converting system is not, however, the sum of currents represented by curves 41 and 42. If the currents flowing from circuit 6 to the different converters were of sinusoidal wave form, the joint current flowing through circuit 6 would also be of sinusoidal wave form and would then be equal to the sum of the several currents flowing in the transformer connections regardless of the presence of phase shifters 33 to 36, because the phase shifters do not disturb the angular relation between a sinusoidal current or current component and the corresponding sinusoidal voltage of the same frequency. The phase shifters, however, cause the harmonic components of the currents to be displaced in phase with respect to the fundamental components thereof by different amounts in the currents of the different phase shifters, and the wave forms of the currents flowing between circuit 6 and the phase shifters are no longer those of curves 41 and 42. The currents flowing between circuit 6 and phase shifters 33, 34, 35 and 36 are then represented by curves 43 to 46, respectively, while the current flowing between circuit 6 and transformer 30 of converter 10 is represented by a curve 47 duplicate of curve 42.

The joint current flowing between circuit 6 and the different converters, which is also the current in circuit 6 if no further current consuming or converting devices are connected therewith, is the sum of the currents represented by curves 43 to 47, and is represented by a curve 48. As a result of the connection of the converters in the manner described above, the sum of the harmonic components of the eight lowest orders in all the currents supplied by circuit 6 to the converters is equal to zero and these particular components are therefore compensated in the joint current flowing in circuit 6. Of the components remaining in the current of circuit 6 the largest component is the order 29. These remaining components are quite harmless by reason both of their low magnitudes and of the relatively reduced effect of currents of the corresponding frequencies in communication circuits. In fact, it has been found that the reactance opposed by the alternating current circuit to the flow of these current components is generally sufficiently high to limit the magnitudes thereof to a negligible value. The current flowing through circuit 6 is then practically of sinusoidal wave form.

Because the secondary voltages of transformers 17 and 29 to 32, which are impressed through the valves on circuit 7, form a polyphase system, the output voltages of the different converters vary continuously and are generally different from one another; the converter having momentarily the highest output voltage tends accordingly to momentarily supply the greater part of the current transmitted by circuit 7 to cells 28. Each of the different converters thus tends to carry a fluctuating current comprising a substantially uniform current component supplied to the cells and a circulating current component flowing through circuit 7 to the terminals of the other converters. The reactors, such as 22, or the equivalent inductive connections between the converters, including the conductors of circuit 7, serve to control the flow of this circulating current between the converters. By suitably selecting the arrangement of the conductors of circuit 7 and the connections thereof with the converters and, if necessary, by adding suitable reactors in these connections, the flow of circulating current between the converters may be reduced to any desired extent.

While the system described above is capable of completely preventing the flow of harmonic current components of the eight lowest orders in circuit 6 when the voltages of circuit 6 are accurately balanced and of perfectly sinusoidal wave form, it has been found that residual harmonic components of the eight lowest orders may flow through circuit 6 as a result of the presence of harmonic components in the voltages of this circuit. It is, however, possible to reduce the magnitude of these residual components to a great extent by altering the conductivity of the different valves of the system. This result may be obtained either by displacing the taps of some of the control batteries, such as battery 27, or by shifting the phase of some of the voltages impressed on the control transformers by displacing the taps of the corresponding control phase shifters such as autotransformer 38, as is well known. The phase relation between the different converter currents is thereby modified to the extent necessary to again obtain that the sum of the harmonic components of the current may be equal to substantially zero. These residual harmonic components are then compensated in the joint converter current flowing through circuit 6.

It will be understood that the control electrode circuits of all the valves may be jointly readjusted, independently of the adjustment described above, to vary the voltage of circuit 7 without thereby materially disturbing the wave forms of the different converter currents and of the current in circuit 6.

The control of the conductivity of the valves may be also used to substantially suppress predetermined current components in the current flowing through circuit 6 even when the secondary voltages of transformers 17 and 29 to 32 do not form a complete polyphase system of voltages. This operating condition may obtain, for example, if one of the converters is temporarily disconnected from the system to permit inspection and eventual overhaul of any of its elements. If it is assumed, for instance, that converter 12 is rendered inoperative, the current flowing through circuit 6 becomes represented by curve 50 of Fig. 4 having ordinates equal to the sum of the ordinates of curves 43, 44, 45 and 47 only. In this current the harmonic components of orders lower than the 29th are present, although the magnitudes thereof are smaller than they would be in the absence of phase shifters 33, 34 and 35.

Figure 4:
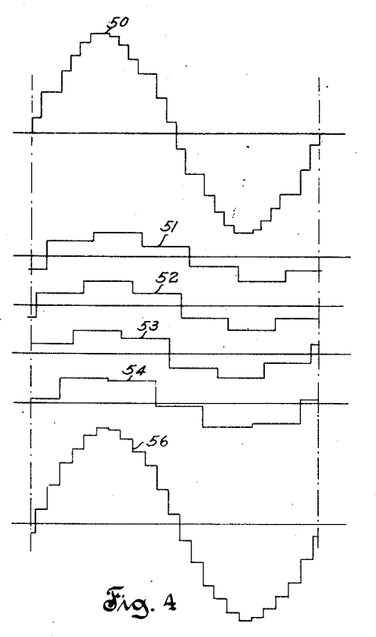
Fig. 4 is a diagram of the currents flowing in some of the connections of the embodiment illustrated in Fig. 1 when one of the converters is inoperative.

These harmonics may be substantially compensated in the current of circuit 6 by delaying the flow of current through the valves of some of the converters to the extent necessary to cause the different currents flowing through all the remaining valves, or at least the fundamental components of these currents, to form substantially a complete polyphase system of currents. In the present instance, the periods of current flow through valves 13 preferably remain unaltered, and the periods of current flow through the valves of converters 9, 10 and 11 are delayed by 3, 6 and 9 electrical degrees respectively. As is well known, the periods of current flow may be so delayed by adjustment of the taps of the control batteries or of the control phase shifters. The fundamental components of the main transformer secondary currents then form a complete polyphase system of currents having twenty-four phases in which successive currents are relatively displaced by fifteen electrical degrees instead of being relatively displaced by twelve degrees as is the original thirty phase system.

When the periods of current flow through the valves are delayed by means of the valve control electrodes, the wave form of the currents flowing through the main transformers remain substantially unaltered. The currents flowing between circuit 6 and the different converters likewise substantially retain their original wave form and may be represented by curves 51, 52, 53, and 54 which are duplicates of curves 45, 47, 44, and 43, respectively, curves 51, 52 and 53, respectively, being, however shifted in phase by 9, 6 and 3 electrical degrees lagging relatively to curve 54. The joint current flowing through circuit 6 is then represented by curve 55 obtained by adding the ordinates of curves 51 to 54. The most prominent harmonic component of this current is now of the 23rd order, and all other harmonic components are of higher orders.

The adjustment disclosed above was described neglecting the fact that the output voltages of converters 9, 10 and 11 are lowered to a slight extent by delaying the periods of current flow through the valves thereof and that the currents supplied from circuit 6 to the four remaining converters are therefore slightly unequal. These currents may, however, be maintained at exactly equal values by readjusting the taps of the primary windings of transformers 29, 30 and 31. The converters then also deliver currents of slightly different magnitudes to circuit 7, and the fundamental components of the transformer secondary currents jointly form a slightly unbalanced polyphase system of currents.

If two of the converters are rendered inoperative, the periods of current flow through the valves of the remaining three converters may be readjusted in a similar manner to cause the fundamental components of the main transformer secondary currents to form an eighteen phase system of currents.

It may occasionally also become necessary to operate the system without autotransformers 33 to 36, for example, if the autotransformers have to be rewound in prevision of a change in the value of the voltage of circuit 6 or of circuit 7. It is then also possible to delay the periods of current flow through the valves of some of the converters to cause certain current components to be compensated in the flow of current through circuit 6. If all five converters are utilized, the periods of current flow through the valves of converter 10 may remain unaltered, and those of converters 8, 9, 11 and 12 may be delayed by 6, 12, 24 and 18 electrical degrees respectively. The fundamental components of the main transformer secondary currents then form a thirty phase system of currents. The magnitudes of the corresponding currents in the connections of the converters with circuit 6 may then be adjusted to exactly equal values by readjusting the taps of the main transformer primary windings. The latter currents retain substantially the wave forms of curves 41 and 42 but are mutually displaced by twelve electrical degrees. The current flowing through circuit 6, which is the sum of the converter currents, may be shown to again have the wave form of curve 48. With the above method of control, however, the current in circuit 6 lags behind the corresponding voltage by substantially fifteen electrical degrees, whereas when the autotransformers are utilized the current in circuit 6 is substantially in phase coincidence with the corresponding voltage.

The system illustrated in Fig. 1 may be modified in different manners to form systems in which the number of phases is increased by different amounts beyond the number of phases of circuit 6. For example, by providing transformers 17 and 32 with polygon connected primary windings and transformers 29, 30 and 31 with star connected primary windings, a system may be formed having the same properties as the system illustrated. The modified system and the system illustrated may also be connected in parallel to form jointly a system involving a number of different phases equal to sixty, or twenty times the number of phases of circuit 6.

Figure 2:
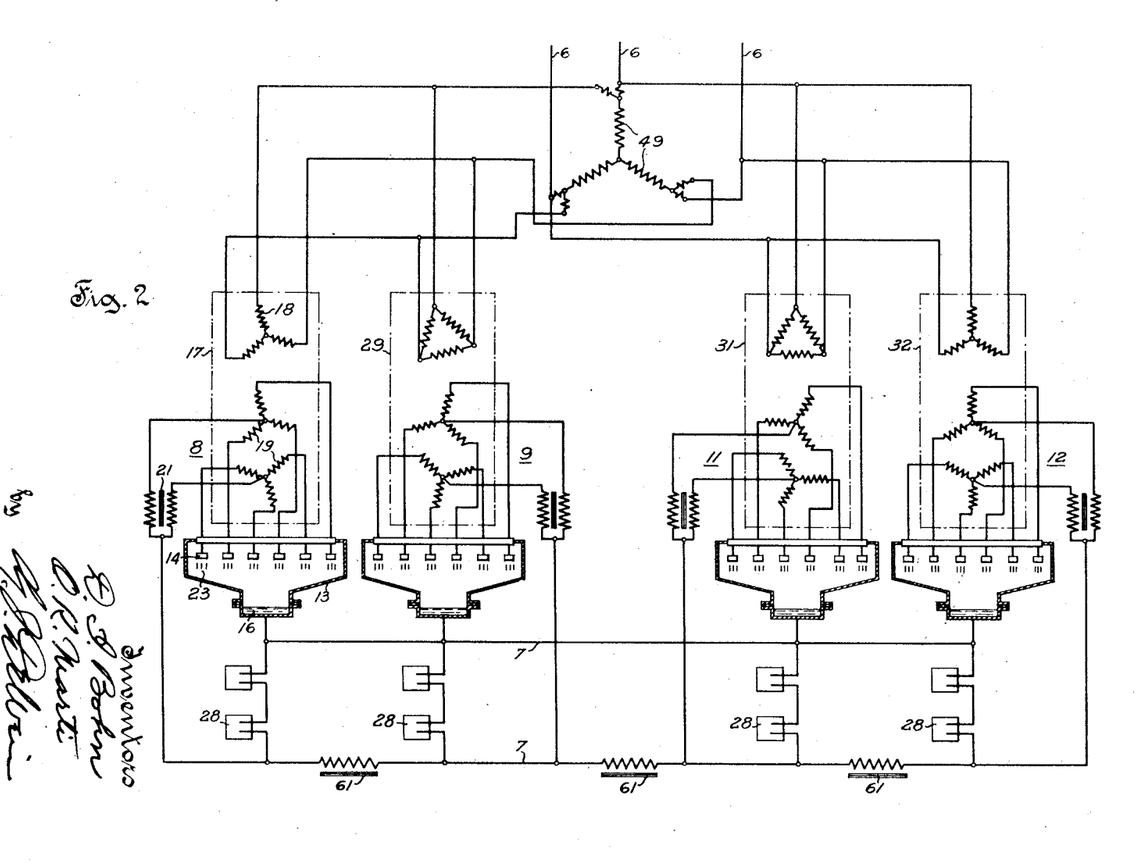
Fig. 2 diagrammatically illustrates a modified embodiment of the present invention in which four parallel six phase converters are connected to form a twenty-four phase system.

The system may also be modified as illustrated in Fig. 2, in which the converters illustrated in Fig. 1 are again utilized with the exception of converter 10. One-half of the converters, consisting of converters 11 and 12, are connected with circuit 6, either directly, as shown, or through a polyphase reactor similar to reactor 37 illustrated in Fig. 1. Converters 8 and 9 constituting the other half of the converters are jointly connected with circuit 6 through a single polyphase phase shifter illustrated as an autotransformer 49 in which the output voltages are displaced by fifteen degrees relatively to the input voltages. It will be understood that an equivalent result would be obtained by connecting both halves of the converting system with circuit 6 through any phase shifter giving a relative phase displacement of fifteen degrees to the two system halves or through two separate phase shifters giving the same result. Regardless of which connection is selected, the secondary voltages of transformers 17, 29, 31 and 32 have the relative phase displacements indicated by the orientation of the winding portions thereof and form a well balanced polyphase system of voltages having a number of phases equal to twenty-four, or eight times the number of phases of circuit 6.

Figure 5:
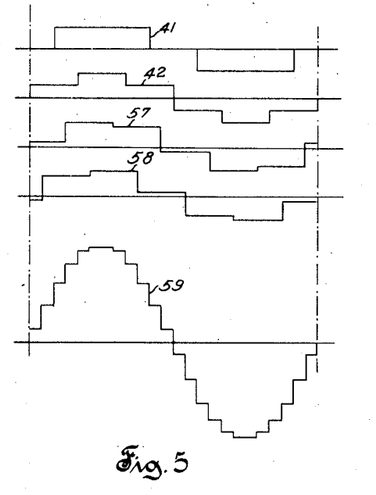
Fig. 5 is a diagram of the currents in some of the connections of the embodiment illustrated in Fig. 2 with the associated alternating current circuit.

The wave forms of the different currents flowing through circiut 6 and the different converters of the present embodiment are illustrated in Fig. 5. Curves 41 and 42 are reproduced therein without change to represent the current flowing between circuit 6 and converters 12 and 11, respectively, inasmuch as these converters are directly connected with circuit 6. The currents supplied by circuit 6 to converters 9 and 8 through phase shifter 49 are represented by curves 57 and 58, respectively. As in the embodiment illustrated in Fig. 1, the harmonic components of the different converter currents are displaced in phase with respect to the fundamental components by different amounts in the different currents. The sum of the six harmonic components of the six lowest orders of the four converter currents equals zero. These harmonic components are therefore compensated in the joint current flowing in circuit 6, which is equal to the sum of the converter currents as represented by curve 59. The remaining harmonic components are usually reduced to a negligible value by the inductance of circuit 6.

In the present embodiment also it is assumed that the connections between the converters through circuit 7 are sufficiently inductive to reduce the flow of circulating currents between the converters to a negligible value. If the connections between the converters and the conductors of circuit 7 are relatively short, the reactances thereof may be relatively small compared to the reactances of the different portions of the conductors of circuit 7 joining the several banks of cells 28 and which may be assumed to be concentrated in a plurality of inductive reactors 61. These reactors control the flow of circulating currents between the different converters to the same extent as reactors 22 illustrated in Fig. 1.

Although but two embodiments of the present invention have been illustrated and described, it will be apparent to those skilled in the art that various changes and modifications may be made therein without departing from the spirit of the invention or the scope of the appended claims.

It is claimed and desired to secure by Letters Patent:

1. In an electric current converting system, the combination with a polyphase alternating current circuit of a predetermined number of phases, a direct current circuit, a plurality of parallel current converters interconnecting said circuits and each comprising a plurality of electric valves and a transformer having a first winding connected with said alternating current circuit and a second winding connected with said valves, said second windings jointly forming a polyphase system having a number of different phases not exceeding four times the first said number of phases, of means connecting said first windings with said alternating current circuit to cause the voltages of all said second windings to form a polyphase system of voltages having a number of phases greater than four times the first said number of phases.

2. In an electric current converting system, the combination with a polyphase alternating current circuit of a predetermined number of phases, a direct current circuit, a plurality of parallel current converters interconnecting said circuits and each comprising a plurality of electric valves and a transformer having a first winding connected with said alternating current circuit and a second winding connected with said valves, said second windings jointly forming a polyphase system having a number of different phases not exceeding four times the first said number of phases whereby the currents flowing between the said first windings and said alternating current circuit each comprise a fundamental component and a plurality of harmonic components of different orders, of means connecting said first windings with said alternating current circuit to cause said harmonic components of at least the four lowest ones of said orders to be compensated in the joint current flowing in said alternating current circuit.

3. In an electric current converting system, the combination with a polyphase alternating current circuit of a predetermined number of phases, a direct current circuit, a plurality of parallel current converters interconnecting said circuits and each comprising a plurality of electric valves and a transformer having a first winding connected with said alternating current circuit and a second winding connected with said valves, said second windings jointly forming a polyphase system having a number of different phases not exceeding four times the first said number of phases whereby the currents flowing between the said first windings and said alternating current circuit each comprise a fundamental component and a plurality of harmonic components of different orders, of means connecting said first windings with said alternating current circuit to cause the said harmonic components to be displaced in phase with respect to the said fundamental components by different amounts in the different said currents whereby the sum of said harmonic components of at least the four lowest ones of said orders is caused to equal zero.

4. In an electric current converting system, the combination with a polyphase alternating current circuit, a direct current circuit, a plurality of parallel current converters interconnecting said circuits and each comprising a plurality of electric valves and a transformer having a first winding connected with said alternating current circuit and a second winding connected with said valves, said second windings jointly forming a system having a predetermined number of different phases, of means comprising phase shifting means connecting said first windings with said alternating current circuit to cause the voltages of all said second windings to form a polyphase system of voltages having a number of phases greater than the first said number of phases.

5. In an electric current converting system, the combination with a polyphase alternating current circuit of a predetermined number of phases, a direct current circuit, a plurality of parallel current converters interconnecting said circuits and each comprising a plurality of electric valves and a transformer having a first winding connected with said alternating current circuit and a second winding connected with said valves, said second windings jointly forming a polyphase system having a number of different phases not exceeding four times the first said number of phases, of means comprising a phase shifting autotransformer connecting at least one of said first windings with said alternating current circuit to cause the voltage of all said second windings to form a polyphase system of voltages having a number of phases greater than four times the first said number of phases.

6. In an electric current converting system, the combination with a polyphase alternating current circuit of a predetermined number of phases, a direct current circuit, a plurality of parallel current converters interconnecting said circuits and each comprising a plurality of electric valves and a transformer having a first winding connected with said alternating current circuit and a second winding connected with said valves, said second windings jointly forming a polyphase system having a number of different phases not exceeding four times the first said number of phases, of means comprising phase shifting means connecting certain ones only of said first windings with said alternating current circuit to cause the voltages of all said second windings to form a polyphase system of voltages having a number of phases greater than four times the first said number of phases, and reactance means connecting the remainder of said transformers with said alternating current circuit to substantially equalize the reactances of all said converters.

7. In an electric current converting system, the combination with a polyphase alternating current circuit of a predetermined number of phases, a direct current circuit, a plurality of parallel current converters interconnecting said circuits and each comprising a plurality of electric valves and a transformer having a first winding connected with said alternating current circuit and a second winding connected with said valves, said second windings jointly forming a polyphase system having a number of different phases not exceeding four times the first said number of phases, of means comprising a phase shifter connecting one-half of said transformers with said alternating current circuit to cause the voltages of all said second windings to form a polyphase system of voltages having a number of phases greater than four times the first said number of phases.

8. In an electric current converting system, the combination with a polyphase alternating current circuit of a predetermined number of phases, a direct current circuit, a plurality of parallel current converters interconnecting said circuits and each comprising a plurality of electric valves and a transformer having a first winding connected with said alternating current circuit and a second winding connected with said valves, said second windings jointly forming a polyphase system having a number of different phases not exceeding four times the first said number of phases, of means comprising a plurality of phase shifters severally connecting all of said transformers, except one, with said alternating current circuit to cause the voltages of all said second windings to form a polyphase system of voltages having a number of phases greater than four times the first said number of phases.

9. In an electric current converting system, the combination with a polyphase alternating current circuit of a predetermined number of phases, a direct current circuit, a plurality of parallel current converters interconnecting said circuits and each comprising a plurality of electric valves and a transformer having a first winding connected with said alternating current circuit and a second winding connected with said valves, said second windings jointly forming a polyphase system having a number of different phases not exceeding four times the first said number of phases, of means comprising a plurality of phase shifters severally connecting all of said transformers, except one, with said alternating current circuit to cause the voltages of all said second windings to form a polyphase system of voltages having a number of phases greater than four times the first said number of phases, and a polyphase reactor connecting the said one of said transformers with said alternating current circuit to substantially equalize the reactances of all said converters.

10. In an electric current converting system, the combination with a polyphase alternating current circuit of a predetermined number of phases, a direct current circuit, a plurality of parallel current converters interconnecting said circuits and each comprising a plurality of electric valves and a transformer having a first winding connected with said alternating current circuit and a second winding connected with said valves, said second windings jointly forming a polyphase system having a number of different phases not exceeding four times the first said number of phases, of means connecting said first windings with said alternating current circuit to cause the voltages of all said second windings to form a polyphase system of voltages having a number of phases greater than four times the first said number of phases, and inductive means in said direct current circuit for controlling the flow of circulating current between said converters.

11. In an electric current converting system, the combination with a polyphase alternating current circuit of a predetermined number of phases, a direct current circuit, a plurality of parallel current converters interconnecting said circuits and each comprising a plurality of electric valves and a transformer having a first winding connected with said alternating current circuit and a second winding connected with said valves, said second windings jointly forming a polyphase system having a number of different phases not exceeding four times the first said number of phases, of means comprising a plurality of phase shifters severally connecting all of said transformers, except one, with said alternating current circuit to cause the voltages of all said second windings to form a polyphase system of voltages having a number of phases greater than four times the first said number of phases, a polyphase reactor connecting the said one of said transformers with said alternating current circuit to substantially equalize the reactances of all said converters, and inductive means in said direct current circuit for controlling the flow of circulating current between said converters.

12. In an electric current converting system, the combination with a polyphase alternating current circuit of a predetermined number of phases, a direct current circuit, a plurality of parallel current converters interconnecting said circuits and each comprising a plurality of electric valves and a transformer having a first winding connected with said alternating current circuit and a second winding connected with said valves, at least certain ones of said windings being connected in star connection and the remainder of said windings being connected in polygon connection, of means connecting said first windings with said alternating current circuit to cause the voltages of all said second windings to form a polyphase system of voltages having a number of phases greater than four times the first said number of phases.

13. In an electric current converting system, the combination with a polyphase alternating current circuit of a predetermined number of phases, a direct current circuit, a plurality of parallel current converters interconnecting said circuits and each comprising a plurality of electric valves and a transformer having a first winding connected with said alternating current circuit and a second winding connected with said valves, certain ones of said first windings being connected in polygon connection and the remainder of said windings being connected in star connection whereby said second windings jointly form a polyphase system having a number of different phases equal to four times the first said number of phases, of means connecting said first windings with said alternating current circuit to cause the voltages of all said second windings to form a polyphase system of voltages having a number of phases greater than four times the first said number of phases.

14. In an electric current converting system, the combination with a polyphase alternating current circuit of a predetermined number of phases, a direct current circuit, four parallel current converters interconnecting said circuits and each comprising a plurality of electric valves and a transformer having a first winding connected with said alternating current circuit and a second winding connected with said valves, two of the said first windings being connected in polygon connection and all the other ones of said windings being connected in star connection, of phase shifting means connecting one of said polygon connected first windings and one of said star connected first windings with said alternating current circuit to cause the voltages of said second windings to form a polyphase system of voltages having a number of phases equal to eight times the first said number of phases.

15. In an electric current converting system, the combination with a polyphase alternating current circuit of a predetermined number of phases, a direct current circuit, five parallel current converters interconnecting said circuits and each comprising a plurality of electric valves and a transformer having a first winding connected with said alternating current circuit and a second winding connected with said valves, at least two of the said first windings being connected in polygon connection and all the other ones of said windings being connected in star connection, of phase shifting means connecting two of said polygon connected first windings and two of said star connected first windings with said alternating current circuit to cause the voltages of said second windings to form a polyphase system of voltages having a number of phases equal to ten times the first said number of phases.

16. In an electric current converting system, the combination with a polyphase alternating current circuit of a predetermined number of phases, a direct current circuit, five parallel current converters interconnecting said circuits and each comprising a plurality of electric valves and a transformer having a first winding connected with said alternating current circuit and a second winding connected with said valves, at least two of the said first windings being connected in polygon connection and all the other ones of said windings being connected in star connection, of phase shifting means connecting two of said polygon connected first windings and two of said star connected first windings with said alternating current circuit to cause the voltages of said second windings to form a polyphase system of voltages having a number of phases equal to ten times the first said number of phases, and reactance means connecting the remaining one of said first windings with said alternating current circuit to substantially equalize the reactances of all said converters.

17. In an electric current converting system, the combination with a polyphase alternating current circuit of a predetermined number of phases, a direct current circuit, five parallel current converters interconnecting said circuits and each comprising a plurality of electric valves and a transformer having a first winding connected with said alternating current circuit and a second winding connected with said valves, at least two of the said first windings being connected in polygon connection and all the other ones of said windings being connected in star connection, of phase shifting means connecting two of said polygon connected first windings and two of said star connected first windings with said alternating current circuit to cause the voltages of said second windings to form a polyphase system of voltages having a number of phases equal to ten times the first said number of phases, reactance means connecting the remaining one of said first windings with said alternating current circuit to substantially equalize the reactances of all said converters, and inductive means in said direct current circuit for controlling the flow of circulating current between said converters.

18. In an electric current converting system, the combination with a polyphase alternating current circuit of a predetermined number of phases, a direct current circuit, a plurality of parallel current converters interconnecting said circuits and each comprising a plurality of electric valves and a transformer having a first winding connected with said alternating current circuit and a second winding connected with said valves, said second windings jointly forming a polyphase system having a number of different phases not exceeding four times the first said number of phases whereby the currents flowing between the said first windings and said alternating current circuit each comprise a fundamental component and a plurality of harmonic components of different orders, of means connecting said first windings with said alternating current circuit to cause said harmonic components of at least the four lowest ones of said orders to be compensated in the joint current flowing in said alternating current circuit, and means for controlling the conductivity of said valves for adjusting the first said currents to compensate residual harmonic components in the joint current flowing in said alternating current circuit.

19. In an electric current converting system, the combination with a polyphase alternating current circuit, a direct current circuit, a plurality of parallel current converters interconnecting said circuits and each comprising a plurality of electric valves and a transformer having a first winding connected with said alternating current circuit and a second winding connected with said valves and supplying currents thereto having fundamental components, of means connecting said first windings with said alternating current circuit to cause said fundamental components to form jointly an incomplete polyphase system of currents, and means for controlling the conductivity of said valves to cause said fundamental components to be relatively displaced in phase to form a complete polyphase system of currents.

20. In an electric current converting system, the combination with a polyphase alternating current circuit, a direct current circuit, a plurality of parallel current converters interconnecting said circuits and each comprising a plurality of electric valves and a transformer having a first winding connected with said alternating current circuit and a second winding connected with said valves and supplying currents thereto having fundamental components jointly forming a polyphase system of current having a predetermined number of different phases, and means for controlling the conductivity of said valves to cause said fundamental components to be relatively displaced in phase to form a polyphase system of currents having a number of phases greater than the first said number of phases.

DONALD I. BOHN.
OTHMAR K. MARTI.